United States Patent [19]
Dubois

[11] 3,774,336
[45] Nov. 27, 1973

[54] FISHING SHOCK ABSORBER SINKER AND DRAG

[75] Inventor: Robert Dubois, Ashokan, N.Y. 12481

[73] Assignee: The Raymond Lee Organization, Inc., New York, N.Y.

[22] Filed: June 1, 1972

[21] Appl. No.: 258,495

[52] U.S. Cl. .............................................. 43/42.72
[51] Int. Cl. ............................................ A01k 91/00
[58] Field of Search ......................... 43/42.72, 17.2

[56] References Cited
UNITED STATES PATENTS

| 1,250,053 | 12/1917 | Tukey | 43/42.72 |
| 1,723,814 | 8/1929 | Scholl | 43/42.72 X |
| 2,594,852 | 4/1952 | Bivens | 43/17.2 |
| 3,011,284 | 12/1961 | Sawyer | 43/42.72 |

Primary Examiner—F. Barry Shay
Assistant Examiner—Daniel J. Leach
Attorney—Howard I. Podell

[57] ABSTRACT

A shock absorber weight sinker and drag for fishing lines that prevents abrupt shocks to the line caused by the sudden strike of a fish. The device consists of a coiled corrosion proof metal spring with doughnut shaped lead weights fastened periodically to coils along the length of the spring, together with coiled end loops for fastening at each end of the spring to the fishing line. One of the doughnut shaped weights is fixedly fastened in place to the coiled spring, while the remaining weights are free to move longitudinally along the spring.

4 Claims, 5 Drawing Figures

Patented Nov. 27, 1973  3,774,336

FISHING SHOCK ABSORBER SINKER AND DRAG

SUMMARY OF THE INVENTION

The purpose of my invention is a combination sinker and drag for fishing lines, with built-in shock absorbing qualities to avoid losing hooked fishes from the reaction of the strike of the fish.

My invention consists of a coiled corrosion-proof metal spring with doughnut-shaped weights fastened along the length of the spring. One of said weights is fixed to one coil of the spring, while the remaining weights are free to move along the axis of the spring.

BRIEF DESCRIPTION OF THE DRAWING

The objects and features of my invention may be further understood with reference to the following detailed description of an illustrative embodiment of the invention taken together with the accompanying drawing in which.

DESCRIPTION OF THE PREFERRED EMBODIMENT

Figure 1:
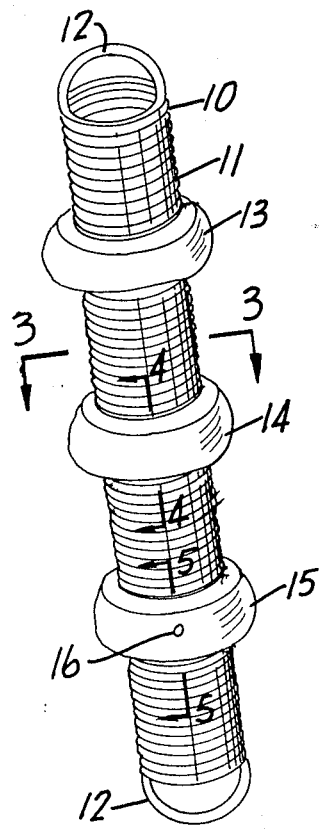
FIG. 1 is an elevation view of the device.
Figure 2:
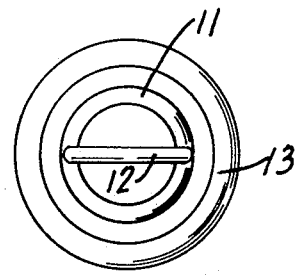
FIG. 2 is a plan view of the device.
Figure 3:
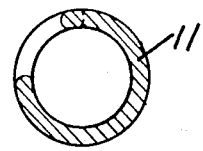
FIG. 3 is a cross-section taken at line 3—3 of FIG. 1.
Figure 4:
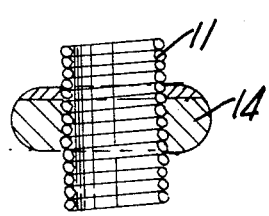
FIG. 4 is a cross-section taken at line 4—4 of FIG. 1.
Figure 5:
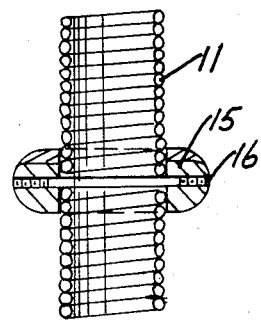
FIG. 5 is a cross-section taken at line 5—5 of FIG. 1.

Turning now descriptively to the drawing, in which similar reference characters denote similar elements throughout the several views, the device 10 as shown in FIG. 1–5 consists of a coil spring 11 of corrosion-proof metal, with end loops 12 for fastening, at each end, to the fishing line.

Doughnut shaped weights 13 and 14 are free to slide axially along the spring, but doughnut shaped weight 15 is fixed in position by means of pin 16.

The doughnut shaped weights 13, 14, and 15 are preferably made of lead. Although the preferred embodiment utilizes three such weights, additional weights may be added as necessary.

In practice, end loops 12 are fastened to swivel units (not shown) attached to the fishing line, and these swivels prevent the free weights 13 and 14 from sliding off the device.

An additional advantage of the device is that fishing lines hooked by sunken objects may be freed by first pulling the line taut, and then suddenly releasing said line, causing the free sinkers to bounce, thus freeing the line.

Since obvious changes may be made in the specific embodiment of the invention described herein, without departing from the spirit or scope thereof, it is indicated that all matter contained herein is intended to be interpreted in an illustrative sense and not a limiting sense.

Having thus described my invention, what I claim as new and desire to secure by Letters Patent of the United States is:

1. A weight sinker and drag for fishing lines with means to limit abrupt shocks to the fishing line, and particularly those shocks caused by the strike of a fish, consisting of
   a coil spring with end loops adaptable to fastening to a fishing line, with
   a weight in the shape of a toroid fastened externally to one of the coil elements of said spring and
   one or more additional toroid shaped weights free to move along the length of said coil, said additional weights being restricted from axial motion along said coil past the fastened weight.

2. The combination recited in claim 1, in which the coil spring is fabricated of corrosion-proof metal.

3. The combination recited in claim 2 in which the coil spring is fabricated of a stainless steel.

4. The combination recited in claim 3 in which the toroid shaped weights are fabricated of lead.

* * * * *